United States Patent [19]

Anderson

[11] 3,958,985
[45] May 25, 1976

[54] EXTRACTION METHOD FOR NON-FERROUS METALS

[75] Inventor: Steven Jon Anderson, 3988 S. 1460 West, Salt Lake City, Utah 84107

[73] Assignee: Chemsep Corporation, Salt Lake City, Utah

[22] Filed: Feb. 7, 1975

[21] Appl. No.: 547,780

[52] U.S. Cl. ............................ 75/117; 75/118 R; 75/120; 75/121; 423/22; 423/44; 423/45; 423/107

[51] Int. Cl.² ................................... C22B 15/00

[58] Field of Search ............... 75/101 R, 105, 110, 75/114, 115, 117, 118, 120, 121; 423/22, 38, 39, 41, 44–46, 107

[56] References Cited
UNITED STATES PATENTS

| | | | |
|---|---|---|---|
| 1,305,788 | 6/1919 | Ferguson | 75/116 |
| 1,415,346 | 5/1922 | Hayward et al. | 423/123 |
| 3,726,667 | 4/1973 | Fuchs | 423/41 |
| 3,868,440 | 2/1975 | Lindblad et al. | 423/41 |

OTHER PUBLICATIONS

Floe, *Am. Ins. of Min. & Met. Engin.*, Tech. Pub. No. 768, Class D, No. 50, 1937.

Floe, *Am. Ins. of Min. & Met. Engin.*, Tech. Publ. No. 735, Class D, No. 49, 1936.

*Primary Examiner*—M. J. Andrews
*Attorney, Agent, or Firm*—Criddle, Thorpe & Western

[57] ABSTRACT

Non-ferrous metals are recovered from metal bearing ores or other metal sources in substantially quantitative yields by treating a finely divided metal bearing material with an aqueous inorganic acid to form a slurry and baking the slurry at atmospheric pressure and at a temperature of about 350° to 800°C. or higher under quiescent conditions for a period of time sufficient to convert the non-ferrous metals into soluble salts. The fumes from the baking process are scrubbed with a dilute acid solution to extract volatile metal salts. The residue is leached with an appropriate solution or solutions to recover the soluble metal salts which are then recovered from the solution by conventional techniques.

36 Claims, No Drawings

EXTRACTION METHOD FOR NON-FERROUS METALS

BACKGROUND OF THE INVENTION

Field of the Invention

This invention relates to a process for the separation of non-ferrous metals from various mineral sources amenable to forming soluble salts of such metals when treated under conditions as hereinafter specified. More particularly, this invention relates to a process for the recovery of substantially quantitative amounts of non-ferrous metals, and especially precious or noble metals, from various mineral sources.

The recovery of non-ferrous metals from metal bearing ores has been practiced for centuries with varying degrees of success. It is well known that metals may occur in nature in their elemental state, as salts, complexes, oxides, sulfides and in various other forms. Because of the complexity of mineral recovery, the field of metallurgy has become a highly sophisticated science.

In general, presently used methods for metal recovery from raw ores usually consist of the steps of crushing, grinding, washing, leaching or smelting followed by recovery such as gravity separation, and electrolytic or chemical precipitation.

Some ores or concentrates may be treated in solution using a leach solution or hot molten materials to dissolve the minerals at some stage in their treatment. From the solutions the metals are separated by various means such as selective precipitation, cementation, electrowinning and gravity. The solution can be an aqueous salt, acid or base or a molten fluid such as is used in smelting.

Large operations for the recovery of non-ferrous metal sulfides such as copper or zinc usually consist of mining the raw material, crushing it, further reducing the particle size by grinding, floatation to concentrate the ore, smelting and electrolytic refining. Metal oxides are usually mined, crushed, leached with an acid solution and electrowon or otherwise precipitated from solution.

Precious metals may be in elemental form and separated by placer operations, i.e., gravity separation by washing through sluice boxes and separated on finishing tables. On the other hand, precious metals such as gold and silver may be treated by crushing the ore, fine grinding it and complexing the precious metal with a cyanide to form a solution and recovering the precious metal.

The noble or precious metals such as gold, silver and the platinum group, (i.e., platinum, palladium, rhodium, ruthenium, iridium and osmium) usually occur in fractions of an ounce per ton of ore. As stated, these metals can occur in their elemental state but are also known to be alloyed with iron, copper, nickel and other metals as well as being combined, complexed or otherwise chemically or physically bound up in many other ways. Gold, for example, is classified as occurring in a free elemental state or as refractory, float gold, telluride, rusty gold, coated, and in several other forms. The coating can consist of hydrocarbons, iron oxides, manganese, tellurium or an encasement in quartz or other minerals. Normally it has been thought that the finer the grinding the better will be the liberation of minerals in a solution or floatation process. However, when the particles are fine enough to float on water they become difficult to recover and are easily lost.

Recovery of metals from ores usually is considered good if ninety-five percent of the assayed quantity is recovered. Many operations yield only from 70 to 90 percent. All recoveries are based on assay analysis of samples taken at various stages of processing such as heads, concentrates, tailings, slag, crude and refined metals. Each ore is different. Some are very complex containing many metals in varying amounts and combined into various compounds or mineral forms.

Assay reports are based on the assumption that the techniques used to dissolve or extract the metal from the sample have been complete and exhaustive. In reality the assay reported is only as effective as the ability of the procedure used to identify all of the metal present in the sample. There are so called unassayable ores wherein the minerals are combined in such a way that they cannot be analyzed by conventional techniques. It has also been found in most cases that insofar as precious or noble metals are concerned, present assay methods only identify a portion of the metal present in the sample. It is obvious that if this observation is correct present methods of recovery of precious metals are inadequate and vast quantities of gold, silver and the platinum group are being dumped as waste materials from various metal recovery operations.

OBJECTS OF THE INVENTION

It is an object of this invention to provide a method of recovering non-ferrous metals in substantially quantitative amounts.

It is also an object of this invention to provide a method of treating metal bearing ores or other materials in such a manner that substantially all non-ferrous metals are converted to soluble salts which can be recovered by conventional extraction techniques.

It is a further object of the present invention to provide a method for the treating of ores or other materials containing precious or noble metals wherein the ore or other material is broken down or altered sufficiently that substantially all of the precious or noble metals are extractable as soluble salts.

It is an additional object of this invention to provide a method of treating ores or other mineral sources in such a manner that the amount of precious metals extracted therefrom are in excess of the yields obtained by presently used conventional methods.

These and other objects are obtained by treating the ore or other mineral source in a finely divided state with an aqueous inorganic acid or mixture of acids to form a slurry and baking the slurry at about 350° to 800°C. at atmospheric pressure under quiescent conditions for a sufficient time for the superheated acid to convert the non-ferrous minerals into a soluble salt form. The gases and fumes from the baking process are scrubbed to remove volatile metal salts produced during the baking and the baked residue is leached to remove the soluble salts formed during baking.

It is known in the art to roast sulfide ores under relatively high temperatures to convert the metal sulfide to a mixture of sulfides and oxides prior to a smelting operation.

It is taught by Floe in Technical Publication No. 768 of The American Institute of Mining and Metallurgical Engineers; Class D., Nonferrous Metallurgy, No. 50, 1937, to subject roasted concentrated copper ores to a sulfuric acid baking in a furnace at temperatures of up to 625°C. In this prior art sulfating process the pre-roasted ore is mixed with a concentrated sulfuric acid solution to form a thick paste, and then baked in a two stage operation at a temperature below 300°C. followed by heating at about 600° – 625°C. In this experimental process about 97 to 98 percent of the copper was reportedly recovered by water leaching of the baked ore. The leached ore was subjected to cyanidation for recovery of gold and silver. The test results show that, although gold recovery was above 95 percent of assayed quantities, silver recovery was below 50 percent and no platinum recovery at all was mentioned.

An earlier publication of Floe et al is Technical Publication No. 735 of the American Institute of Mining and Metallurgical Engineers, Class D, Nonferrous Metallurgy, No. 49, 1936, wherein the production of soluble sulfates from mixtures of metallic oxides is discussed. This paper is experimental in nature and is emphatic in stating that no final conclusions for the sulfating of ores can be drawn from the theoretical data contained therein. In general, this paper teaches sulfating metal oxides, mixtures of metal oxides or pre-roasted ores with an excess of sulfuric acid to form a thick paste and then heating at various temperatures. The article cautions against the use of excess water in the acid since such water must be removed by boiling. No mention is made of sulfating and recovering precious metals.

It is significant that Rosenquist, in Principles of Extractive Metallurgy, McGraw Hill, Inc., 1974, Page 251, mentions that attempts to subject iron-copper sulfide ores to a sulfating roast in order to bring the copper into water soluble form have only met with limited success.

The difficulties of the prior art have been overcome by the present invention which, in addition, has provided highly unexpected results in the recovery of precious or noble metals. It is significant that the prior art treats pre-roasted ores, whereas in the present invention one may treat raw ores, roasted ores or ores taken from any stage in a recovery process whether a placer operation, smelting, leachings or any other stage of recovery. The present invention achieves superior results and does not require that the ores be roasted prior to treatment. While it is not known exactly how the process of the invention operates on the metal bearing materials to provide complete conversion of the non-ferrous metals into soluble salts the following generalizations may be made utilizing aqueous sulfuric acid as the baking reagent. It must be kept in mind, however, that acids other than sulfuric may be used. For example, hydrochloric, hydrofluoric, nitric, perchloric and hypochlorous acids or a combination of acids, i.e., hydrochloric and nitric (aqua regia) may be used.

When a metal sulfide (MS) is brought into contact with an oxidizing source the following reaction will occur:

$$2MS + 3O_2 \rightarrow 2MO + 2SO_2 \tag{1}$$

Sulfur dioxide in the presence of oxygen is further oxidized to sulfur trioxide as follows:

$$2SO_2 + O_2 \leftrightarrows 2SO_3 \tag{2}$$

An additional or alternate source of sulfur trioxide is obtained by heating sulfuric acid according to the following equation:

$$H_2SO_4 \rightarrow H_2O + SO_3 \tag{3}$$

Sulfur trioxide in turn reacts with metal oxides as follows:

$$MO + SO_3 \leftrightarrows MSO_4 \tag{4}$$

By combining the above equations one arrives at the overall equation, $$2MS + 4O_2 \rightarrow 2MSO_4 \tag{5}$$

It is evident from the above that in order to obtain complete conversion of a metal sulfide or oxide to the soluble sulfate it is necessary to oxidize the sulfur present into its highest oxidation state, i.e., MS to $SO_2$ to $SO_3$ to $MSO_4$. For example, higher concentrations or partial pressures of $SO_2$ will result in more $SO_3$ being formed and higher partial pressures of $SO_3$ will result in the formation of more sulfates.

As indicated in equation (4) the reaction is reversible and metal sulfates will decompose into metal oxides and sulfur trioxide when heated above their decomposition temperature driving the reaction to the left. It is also evident from equation (4) that high partial pressures of $SO_3$ will inhibit the decomposition of the sulfates and drive the reaction to the right depending upon the temperature.

The same reasoning would hold true for inorganic acids other than sulfuric, i.e., nitric, hydrochloric, hydrofluoric, perchloric and hypochlorous.

In order to maximize or optimize soluble salt formation certain criteria must be met. Already mentioned is the fact that high partial pressures of $SO_3$ or other appropriate reagents which will react with metal sulfides and oxides to form soluble salts must be maintained. The prior art articles referred to teach using theoretical percentages of $H_2SO_4$ to metal oxide of from about 100 to 135 percent. It has been found that according to the present invention such ratios are insufficient to enable the formation of soluble salts of the non-ferrous metals and, in particular, to change or release the noble metals from whatever form they may be into a soluble form. It has been found that stoichiometric ratios of the acid anion to the metal ion to be treated and converted to a recoverable form should be at least 1.5:1 with ratios of 2:1 and in some cases even 3:1 or greater being preferred. In the case of noble metals ratios of 10:1 may be used with ratios of 15:1 being preferred.

Another critical factor to the invention is that the acid-mineral slurry be heated under quiescent conditions. The use of stirring or rabbling during the baking process reduces the partial pressure of $SO_3$ or other reagents within the baking mixture and promotes the decomposition of the metal salt into the metal oxide and a sulfur oxide. Stirring or mixing during the baking process also brings the metal sulfates and sulfides into contact which, in an oxidizing atmosphere will react according to the following equation:

$$MSO_4 + MS + O_2 \rightarrow 2MO + 2SO_2 \tag{6}$$

In order to maximize the partial pressure of the $SO_3$ or other reactant with the metal sulfide or oxide, the well-mixed slurry of aqueous acid and mineral source is placed in a pan or pans in an oven or other heat source and heated to the desired temperature for the desired length of time. If, however, it is necessary to stir or otherwise disturb the surface of the baking mixtures, an alternate method would be to circulate larger quantities of $SO_3$ or other gas throughout the baking chamber to maintain the necessary partial pressures. This would be a less preferable and more expensive method. The heat source can be either radiant heat or heat supplied directly by combustion gases. Radiant heat is preferred since all the gases leaving the baking area are scrubbed with an aqueous solution to assure complete mineral recovery. The baking operation may be either batch or continuous and is carried out at atmospheric pressure. In preparing the mineral source for the acid baking process it is important that the mineral be reduced to a particle size of at least 100 mesh and preferably from about 200 to 600 mesh. Each mineral source should be tested to determine optimum size since each ore or other source has different characteristics.

The slurry is placed in a pan having a depth of from about 2 to 24 inches. The depth of the slurry is determined by practical considerations. The slurry must be sufficiently deep to allow a build-up of $SO_3$ or other reagent pressure within the mineral source and bring about the change within the ore which will convert the non-ferrous metals to soluble salts. Too great a depth will obviously require too great a time to reach optimum temperature within the center of the superheated acid-mineral mixture. Obviously the slurry is subjected to superheating and all liquid is evaporated off leaving a dried residue.

It is essential that sufficient liquid be supplied initially to form a slurry of the finely divided mineral source to enable complete mixing of the mineral with the acid. In some instances it may even be beneficial to allow the liquid slurry to sit, after thorough mixing, for a period of time before baking. In general, weight ratios of solid to liquid will vary from a low of 2:1 to a high of 1:5 or greater, depending upon the mineral source being treated.

The baking is done slowly to allow the build-up of maximum partial pressures of the reagent gases $SO_3$, $NO_2$, HCl, HF and the like. Ordinarily it will take at least 30 minutes for the slurry to reach a temperature of from 350° to 800°C. which is then maintained for a period of from 0.5 to 4 hours. Longer baking times may be used but are, in general, unnecessary.

Temperatures between about 350° to 800°C. are believed to define the practical operating limits. It is important that the slurry be baked to dryness. Concentrated sulfuric acid has a boiling point of about 300° C. with other acids boiling below that temperature. In addition to baking to dryness, the gaseous materials from the aqueous acids such as $SO_3$, $NO_2$, HCl, HF and the like remain in the baking mixture at sufficiently high partial pressures to continue to act upon the baking mixture causing further breakdown of the ore and release of its metallic components in soluble or extractable form. The temperatures used will largely depend upon the type of ore or metal source being treated. Upper limits will often depend upon the decomposition temperature of the solubilized metal in the bake.

When iron may present a problem, such as in the treating and extraction of copper and zinc from ferrous ores, operation within certain limits becomes critical. One of the problems encountered in the prior art is the presence of iron and the separation of non-ferrous metals from iron. Iron sulfides may be converted to ferric and ferrous oxides and roasted with $SO_3$ to form ferric and ferrous sulfates according to the following equations:

$$FeO + SO_3 \rightleftarrows FeSO_4 \qquad (7)$$

$$Fe_2O_3 + 3SO_3 \rightleftarrows Fe_2(SO_4)_3 \qquad (8)$$

It is noted that the above reactions are also reversible. Ferrous sulfate begins to decompose at 167°C. and both ferrous and ferric sulfates have energetic decomposition temperature of 480°C. according to the following equation:

$$FeSO_4 \rightarrow Fe_2O_3 \cdot 2SO_3 \qquad (9)$$

$$Fe_2(SO_4)_3 \rightarrow Fe_2O_3 \cdot 2SO_3 + SO_3 \qquad (10)$$

Upon further heating to 560°C. the basic salt further decomposes to ferric oxide as follows:

$$Fe_2O_3 \cdot 2SO_3 \rightarrow Fe_2O_3 + 2SO_3 \qquad (11)$$

Copper sulfate on the other hand has a decomposition temperature of 670°C. as follows:

$$CuSO_4 \rightarrow CuO \cdot SO_3 \qquad (12)$$

When sulfating a copper ore such as chalcopyrite ($CuFeS_2$) high partial pressures of $SO_3$ are essential to transform all of the copper to copper sulfate and oxidize the iron to $Fe_2O_3$ which is insoluble in water and dilute sulfuric acid solution. In a sufficient oxidizing atmosphere iron is completely converted to $Fe_2O_3$ because of its great heat of formation. By maintaining an excess of $SO_3$ and temperatures between the decomposition temperature of iron and copper sulfates and operating under quiescent conditions these results are accomplished. Temperature control is also important because at about 650° C. $SO_3$ begins to decompose into $SO_2$ and $O_2$. Further, in the absence of $SO_3$ ferric oxide will combine with copper oxide to form the insoluble cupric ferrite ($Cu_2O \cdot Fe_2O_3$) or cuprous ferrite ($CuO \cdot Fe_2O_3$). Above the decomposition temperature of $SO_3$ the formation of copper ferrites is quite rapid.

It is therefore essential in applying the process of the invention to copper and zinc extraction processes that temperatures be maintained between about 575° to 650° C.

Zinc ferrite ($ZnO \cdot Fe_2O_3$), zinc oxide and zinc sulfide will all react in an oxidizing atmosphere under 650° C. according to the following equations:

$$ZnS + H_2SO_4 + 3/2O_2 \rightarrow ZnSO_4 + SO_2 + H_2O \qquad (13)$$

$$ZnO + SO_3 \rightarrow ZnSO_4 \qquad (14)$$

$$ZnO \cdot Fe_2O_3 + H_2SO_4 \rightarrow ZnSO_4 + Fe_2O_3 + H_2O \qquad (15)$$

Further, it has been shown that the decomposition or rearrangement of the molecular structure of iron compounds within the mineral source is accompanied by a release of noble metals heretofore unknown to exist and not detected by present assay techniques. For example, ferrosoferric oxide (magnetite) $Fe_3O_4$ is converted to ferric oxide (hematite) $Fe_2O_3$ during the process with the release of noble metals. It is not known what form the noble metals are in prior to treatment according to this process nor is it known how the noble metals may be physically or chemically bound to other elements. It is known, as will be demonstrated in the following examples, that when mineral sources such as unconcentrated heads, concentrates, slags, residues and the like are assayed for precious metals, then treated according to the present invention and reassayed, a substantial increase in noble metal content is found. This is true even in cases where the initial analysis failed to show the presence of the noble metal at all. Sometimes this increase is in the order of several hundred percent. This has been demonstrated by the running of several hundred test samples with the assay work being done by independent certified assay laboratories. Just what form this metal is in after processing is not known with certainty. It is thus evident that in a placer mining operation only a portion of the noble metals are recovered. It is also evident that with the current price of noble metals, substantial values in such metals are being unrecovered by present recovery processes.

Another factor critical to this invention which especially adds to the recovery of noble metals is that all fumes or gases emanating from the baking process be washed and scrubbed with water, a salt solution or dilute acid or base. The volume of solution used and concentration of acid or other reagent will depend upon the gases being scrubbed, the amount of solution bled off and the type of scrubber used. This will, in most cases, be determined on an empirical basis and the strength of solution is not a critical point of this invention. Some metal compounds, noble metals in particular, are gasified during the baking process. This may be due to a relatively low decomposition temperature or due to water solubility wherein the metal salts are carried off in the vaporized water. Platinum chloride, for example, decomposes at a temperature of 581° C. and platinum sulfate is soluble in cold water and acid and decomposes in hot water. Gold chloride (AuCl or $AuCl_3$) will decompose a sublime at temperatures ranging from 265° to 290° C. and is soluble in water. Gold nitrate (nitratoauric acid) decomposes at 72° C. and silver nitrate decomposes at 444° C.

The washing or scrubbing process may be carried out in any conventional apparatus which will bring about intimate contact with the fumes or gases and the scrubbing solution. For example, a packed tower may be used with the scrubbing liquid being recirculated over the packing or an adjustable venturi scrubber may be employed using recirculated liquid for cooling and scrubbing the gases. Part of the recirculated liquid containing the dissolved metals can be bled off and treated by conventional techniques for the recovery of the metals. The scrubbed gases can be fed to a recovery system for the recovery of sulfur, nitrogen, chlorine or fluorine compounds depending upon the acid used in the baking process.

Since some metals are more easily converted to one salt form than another it may be beneficial in some cases to form the slurry from a mixture of acids or to dissolve or add a metal salt such as sodium chloride or ferric sulfate to the slurry prior to baking. Thus, for example, if sodium chloride is added to a sulfuric acid slurry and a particular metal is more prone to form a chloride than a sulfate the chloride will be formed.

When the baked residue is removed from the furnace it may or may not be cooled and is then leached with a dilute acid solution. The soluble salts from the residue are dissolved into the leach solution. Since the residue prior to leaching contains anhydrous acids from the baking operation there is a considerable amount of heat formed when the aqueous leach solution is added to the residue. Again the amount of leach solution added and the concentration thereof will be a function of the minerals being extracted and the amount of minerals in the residue to be leached. Obviously sufficient solution should be used to dissolve the non-ferrous salts. In some cases it may be necessary to carry out multiple leaches. For example, a baked copper or zinc residue may be leached with an acid solution one or more times to recover the copper or zinc and the leached residue may then be treated with sodium or potassium cyanide to dissolve the gold and silver. These extraction techniques are known in the art.

The metal salts in the leach solution can be recovered by coventional means. For example, copper may be plated out by electrolysis of the solution. Electrolytic recovery of copper from leached solutions is affected with insoluble anodes. The direct current applied causes copper to plate out on the cathode, and the electrolyte is continuously depleted in copper. Impurities are preferably removed before electrolysis; therefore there is no build-up of impurities in the cell. The spent electrolyte may then be diluted with water in its original acidic content and used over again as a solvent for leaching more residue. The leaching out and electroplating of zinc and other metals may be carried out in similar fashion. If desired, solvent extraction techniques known to the art may be employed.

Certain of the noble metals, gold and silver in particular, may remain in the residue after the leaching operation. These precious metals may be recovered by the conventional practice of dissolving the gold and silver in solutions of potassium or sodium cyanide as is conventionally carried out in the art.

The gold and silver are dissolved by the chemical solution usually with varying amounts of oxygen or air added to complete the taking of the metals into solution. The solution containing the noble metals is then passed in turn through a thickener and a clarifier and then sent to a precipitating system where the gold and silver values are precipitated and the precipitate is reduced to the elemental silver or gold bullion in a furnace.

In the case of the chloride vapor, some chlorinating acid is used such as aqua regia or a straight chloride bake. The residue then can be treated in some cases with just a water leach or a leach containing a mild amount of either aqua regia or hydrochloric acid and virtually all of the gold, silver and platinum will go in the solution. The gold, silver and platinum from this solution can then be recovered by standard procedures such as precipitating the gold with the addition of oxalic acid in a purified solution and also the addition of formic acid to precipitate the platinum out of the chloride solution.

The primary metals recovered in the scrubbing solution are gold and platinum. The gold and platinum may be recovered from the scrubbing solution by bleeding off a certain portion of the scrubbing solution as it is being recirculated and passing this bleed stream through a resin column wherein the gold and platinum are absorbed on the resin. Once the resin column becomes loaded it may be regenerated and the platinum or gold recovered as the chloride by desorbing the platinum and gold from the resin column with the stripping solution of dilute hydrochloric acid.

Typical ion exchange resins which may be used are identified only by their tradename as follows: (a) Srafion NMRR manufactured by Ayalon Water Conditioning Co., Ltd, Haifa, Israel, (b) Ionac SRXL manufactured by Ionac Chemical Co., Birmingham, N.J., and (c) PAZ manufactured by Sela Electronics, Inc., N.Y., N.Y.

Other recovery methods may also be employed in extracting the precious metals from the scrubbing solution or baked residue. In the case of a chloridizing bake aqua regia or a straight chloride such as hydrochloric acid, perchloric acid or hypochlorous acid may be used. The baked residue in these cases can generally be treated with a water leach, a dilute leach solution of hydrochloric acid or aqua regia and virtually all of the gold, silver and platinum will go into the leach solution. These precious metals can then be recovered by standard procedures such as precipitating the gold by the addition of oxalic acid in a purified solution and also by the precipitation of platinum out of the chloride solution by the addition of formic acid.

Since it is not known just what form the precious metals are converted to during the baking process, different methods may be employed to obtain maximum yields. For example, the use of a sulfating roast may not convert the gold, silver and platinum to sulfates but does in some way release these metals from the ores in such a way that they can be extracted into a solution. It may be desirable to heat the pregnant leach solution to dryness and recover the precious metals by a smelting operation.

The process described is applicable to any mineral sources and therefore may be used to treat unconcentrated ores commonly known as raw ore, concentrates, black sands, tailings, residues, slags, etc. In other words mineral sources from any processing stage may be treated.

The following examples are illustrative of the invention only and are not to be construed as being determinative of the scope of the invention. In the following examples all tests were run by placing a mixture of finely divided solids of less than 100 mesh with the acids mentioned in each example to form a slurry. The container into which the slurry was placed was then put in a furnace and baking was accomplished by heating the container and contents to the stated temperatures. The furnace was sealed and equipped so that the fumes and vapors resulting from the baking operation would pass through a scrubbing system to put the soluble materials into solution. The solution used for scrubbing contained acid to assist in dissolving fumes from the gases. The gases were moved from the furnace through two waterjet pumps and a packed scrubbing tower and then passed to the atmosphere. All results are reported as OPT (ounces per ton), percent weight, or if not otherwise stated, in grams.

EXAMPLE 1

A gold ore concentrate was reduced in particle size to 90% being less than 150 mesh size. A 53.5 gram sample of such concentrate was mixed with 135 grams 98% $H_2SO_4$, 3 grams of NaCl and 20 grams of water to make a total slurry mixture of 211.5 grams. The slurry was evenly mixed in a porcelain beaker and allowed to stand for 24 hours at a low heat and then placed into the furnace at ambient temperatures. It required 50 minutes for the furnace to reach an operating temperature of 630°C., which temperature was then maintained for two hours.

A solution of 6000 mls. of water containing 50 mls. of concentrated HCl was used as the scrubbing solution which was recirculated continuously by means of two pumps. The baking procedure was carried out under quiescent conditions. The residue was removed from the furnace, allowed to cool, and was found to consist of 63.3 grams.

The ore prior to processing, the scrubbing solution and residue, were analyzed by an atomic absorbtion spectrophotometer and were found to contain the following amounts of gold, silver and platinum:

TABLE 1

|  | Au OPT | Au Grams | Ag OPT | Ag Grams | Pt OPT | Pt Grams |
|---|---|---|---|---|---|---|
| Concentrate before processing | 303.9 | .558 | 98.66 | .181 | .0102 | .0000187 |
| Baked residue | 416.14 | .903 | 119.70 | .260 | .0140 | .0000303 |
| Scrubber solution | — | .000816 | — | .000420 | — | .000150 |
| Total wt. after processing | — | .904 | — | .2604 | — | .000180 |
| Equivalent OPT of original concentrate | 492.32 | — | 142.07 | — | .0982 | — |
| Ratio of Values (Processed ore/ Unprocessed ore) | 1.62 | 1.62 | 1.44 | 1.44 | 9.63 | 9.63 |

OPT = oz per ton

From the above it is evident that the process as carried out altered the ore concentrate in some manner to release quantities of gold, silver and platinum not detectable prior to processing. It is also significant to note that the majority of the platinum was recovered in the scrubbing solution.

EXAMPLE 2

A copper ore concentrate consisting mostly of chalcopyrite was ground to 90% being minus 325 mesh size. A 300 gram sample of this concentrate was mixed with 360 grams of 98% $H_2SO_4$ and 80 grams of water to form a total charge of 740 grams. This charge was stirred and heated to a temperature of about 100°C. in a pan for about one hour and then placed in a furnace at ambient temperatures. Once placed in the furnace stirring ceased and the charge was baked under quiescent conditions. It took approximately one hour and five minutes for the furnace to reach a temperature of 630°C. The slurry was then baked for an additional two hours.

The vapors and fumes emanating from the baking process were scrubbed with 7175 mls. of water containing 100 mls. of concentrated $H_2SO_4$. The scrubbing solution was recirculated during the baking procedure by means of pumps. The baked charge was removed from the furnace and allowed to cool and was then weighed yielding a residue of 482.9 grams. The residue was leached for a period of one hour and 45 minutes in water and then for a period of three hours in a dilute sulfuric acid solution. The dried residue after leaching consisted of 85.46 grams. The unprocessed chalcopyrite concentrate, the unleached residue, the leached solution, the gas scrubber solution and the residue obtained after acid leaching were all analyzed by atomic absorbtion analytical techniques with the following results:

TABLE 2

|  | Au | Ag | Pt | Cu | Mo |
|---|---|---|---|---|---|
| Unprocessed concentrate | .3310[1] | 3.35[1] | .0617[1] | 25.98[2] | .353[2] |
| Wt. in grams | .00319 | .0344 | .000634 | 77.94 | 1.06 |
| Wt. in unleached residue | .00425 | .0442 | .00147 | 78.038 | 1.12 |
| Wt. in leached residue | .00425 | .0442 | .00147 | 1.958 | 1.12 |
| Leach solution, wt. in grams | — | — | — | 76.08 | — |
| Gas scrubber solution wt. in grams | .000861 | .00144 | .00115 | .0144 | ND[3] |
| Total wt. after processing | .00511 | .0456 | .00262 | 78.05 | 1.12 |
| Equivalent OPT of original concentrate | .497 | 4.45 | .255 | 26.01[2] | .374[2] |
| Ratio of values Processed ore/Unprocessed ore | 1.60 | 1.33 | 4.13 | 1.001 | 1.06 |

[1] = oz per ton
[2] = percent
[3] = not detected

An 85 gram sample of the dried residue was treated under ambient conditions with 600 mls. of water and 0.8 grams of NaCN, stirred for two hours and allowed to sit for 10 hours. Upon analysis it was determined that 99.3% of the gold and 98.8% of the silver had been cyanided from the residue. The above data also show a recovery of 97.5% of the copper detected in the unleached residue after processing was also obtained.

The above results clearly indicate again the value of the present invention in releasing and recovering noble metals in amounts in excess of those identifiable by present assay techniques. As shown the noble metals and copper contained in the processed residue can be recovered by leaching followed by cyanide treatment to yield essentially quantitative recoveries.

EXAMPLE 3

A beryllium ore sample was ground to minus 150 mesh and 50 grams of such sample was mixed with 72 grams of 98% $H_2SO_4$ and 15 grams of water to make a total charge of 137 grams which was stirred in a container and placed in a furnace under quiescent conditions at 300°C. The temperature was slowly elevated over a period of 45 minutes to reach an operating temperature of 630°C. which was maintained for a period of two hours. The fumes and gases released from the baking process were scrubbed with 5100 mls. of water containing 50 mls. of 98% $H_2SO_4$. After cooling the residue from the baking process was leached in a solution comprising 250 mls. of water and 50 mls. of 98% $H_2SO_4$. The leached residue weighed 30 grams. The unprocessed ore, the unleached residue, the leaching solution, the leached residue and the gas scrubber solution were all analyzed by atomic absorbtion techniques to yield the following as reported in Table 3:

TABLE 3

|  | Au | Ag | Pt | Be |
|---|---|---|---|---|
| Unprocessed ore | .0175[1] | ND[2] | .00818[1] | .131[3] |
| Wt. in grams | .000030 | — | .000014 | .0655 |
| Wt. in unleached residue | .000038 | .00147 | .000029 | .0716 |
| Wt. in leached residue | .000038 | .00147 | .000029 | .000156 |
| Wt. in leach solution | — | — | — | .0715 |
| Wt. in scrubber solution | .000163 | .000408 | .000204 | .000408 |
| Total wt. recovery | .000201 | .00188 | .000233 | .0720 |
| Equivalent oz/ton of unprocessed ore | .118 | 1.09 | .136 | — |
| Ratio of values Processed ore/Unprocessed ore | 6.70 | Infinite | 16.64 | 1.10 |

[1] = oz per ton
[2] = not detectable
[3] = percent

Again noble metals were released and recovered in quantities greater than the initial assay showed. It is significant to note the amount of precious metal recovered in the scrubber solution and to further note the recovery of beryllium in the leach solution was 99.7% of that in the unleached residue.

EXAMPLE 4

Slag was obtained from the dump of a lead smelter and ground to minus 150 mesh. A 20 gram slag sample was mixed with 18 grams of 98% $H_2SO_4$, 10 grams of $Fe_2(SO_4)_3$ and 60 grams of water, making a total charge of 108 grams which was placed in a container, stirred thoroughly and placed in a furnace. The furnace reached a temperature of 630°C. in a period of approximately one hour and was maintained at 630°C. for two hours. The residue was removed from the furnace, cooled, and leached in a 10% sulfuric acid solution for two hours. Analysis prior to treatment showed a zinc content in the slag of 7.44% of 1.488 grams of zinc. In the sample the dried leached residue contained 0.0154 grams of zinc. The leached solution contained a recovery percentage of 99% zinc.

EXAMPLE 5

Chromium containing sands were ground to minus 150 mesh. A 50 gram sand sample was mixed with 54 grams of 98% $H_2SO_4$ and 10 grams of water in a container making a total charge of 114 grams. After stirring the container was placed in a furnace which was heated to 630°C. and maintained at that temperature for two hours and fifteen minutes. The fumes from the baking process were scrubbed with 4500 mls. of water plus 100 mls. of 98% sulfuric acid. After baking the unleached residue was cooled and weighed and found to contain 69.7 grams. The residue was not leached and an analysis was run on the unprocessed sands, the unleached residue and the gas scrubber solution with the results being as reported in Table 5A:

TABLE 5A

|  | Au | Ag | Pt | Cr |
|---|---|---|---|---|
| Unprocessed chromite sand | .0203[1] | ND[2] | .0228[1] | .392[3] |
| Wt. in grams | .000035 | — | .000039 | .196 |
| Wt. in unleached residue | .0000435 | .000180 | .0000217 | .737 |
| Wt. in scrubber solution | .00072 | ND | .00126 |  |
| Total Wt. after processing | .000764 | .000180 | .00128 | .737 |
| Equivalent oz per ton of unprocessed ore | .443 | .105 | .748 | 1.47[3] |
| Ratio of values Processed ore/ Unprocessed ore | 21.83 | Infinite | 32.82 | 3.76 |

[1] = oz per ton
[2] = not detectable
[3] = percent

A 12.4 gram sample of the chromite residue was rerun by mixing 12.4 grams of the residue with 10 mls. of 98% $H_2SO_4$ and 7 mls. of water. The mixture was placed in an oven which was brought to 630°C. over a period of 35 minutes and baked at 630° for an additional hour and 35 minutes under quiescent conditions. The fumes coming from the baking process of this procedure were scrubbed with 4500 mls. of water containing 100 mls. of concentrated hydrochloric acid solution. The residue was removed from the furnace, cooled and weighed 15.3 grams. This residue was leached with a dilute $H_2SO_4$ solution. The unleached residue from the first run, the leached residue after the second baking, the leached solution and the gas scrubber solution were all analyzed with the results being as follows in Table 5B:

TABLE 5B

|  | Au | Ag | Pt | Cr |
|---|---|---|---|---|
| Residue from 1st run | .0182[1] | .0754[1] | .00910[1] | 1.06[2] |
| Wt. in grams | .0000068 | .00018 | .0000039 | .131 |
| Wt. in unleached residue | .0000320 | — | .0000172 | — |
| Wt. in leached residue | — | — | — | .00142 |
| Wt. in leach Solution | — | — | — | .348 |
| Wt. in scrubber solution | .000108 | — | .000144 | .116 |
| Total weight of rerun products | .000140 | — | .000161 | .4656 |
| Equivalent oz per ton | .375 | — | .376 | — |
| Equating results to raw sands | .523 | — | .524 | 5.24 |
| Ratio of value Reprocessed ore/ Processed ore | 20.58 | — | 41.28 | — |
| Percent of chromium |  |  |  |  |

TABLE 5B-continued

|  | Au | Ag | Pt | Cr |
|---|---|---|---|---|
| leached from rebaked residue | — | — | — | 98.9 |

[1] = oz per ton
[2] = percent

By adding together the results from both runs the total recovery is as reported in Table 5C:

TABLE 5C

|  | Au | Ag | Pt | Cr |
|---|---|---|---|---|
| Total recovery (both runs) | .966[1] | .1051[1] | 1.27[1] | 6.71[2] |
| Gross ratios of Twice Processed ore/ Unprocessed ore | 47.59 | Infinite | 55.70 | 17.12 |

[1] = oz per ton
[2] = percent

The residue was then cyanided to check the gold recovery. A yield of 99.4% of the gold in the residue was recovered.

The above results substantiate that not only are the noble metals recovered in quantities in excess of those shown by conventional assay techniques, but also, the recovery of chromium in this instance is also greatly enhanced.

EXAMPLE 6

The tests made in this example were done to determine what effect particle size had on mineral recovery. The ore used was high in iron and somewhat magnetic. Two samples were run, the first was ground to about 100% minus 150 mesh and the second was ground to about 400 mesh.

RUN A (150 MESH)

A mixture comprising 46.3 grams of ground ore, 90 grams of 98% $H_2SO_4$, 2 grams of NaCl and 20 grams of water were thoroughly stirred in a container and allowed to sit for 24 hours. The container and contents were then placed in an oven under quiescent conditions and the furnace was brought to a temperature of 630°C. and maintained at such a period of 2 hours. All fumes and gases leaving the furnace were passed through a scrubber using recirculated scrubber solution in the amount of 5400 mls. of water plus 100 mls. of concentrated HCl. After cooling a residue of 60.2 grams was obtained. No attempt was made to leach the minerals out of the treated residue. Analysis was made of the raw ore prior to processing, the unleached residue and the scrubber solution, and are reported as follows in Table 6A:

TABLE 6A

|  | Au | Ag | Pt | Ti |
|---|---|---|---|---|
| Unprocessed Ore | .00823[1] | 0 | .0205[1] | 6.80[2] |
| Wt. in grams | .0000131 | 0 | .0000325 | 3.148 |
| Wt. in residue | .000236 | .00000813 | .0000326 | 3.223 |
| Wt. in scrubbed solution | .000130 | .000378 | .0000702 | .020 |
| Total Wt. after processing | .000366 | .000386 | .000103 | 3.243 |
| Equivalent oz per ton of unprocessed ore | .230 | .243 | .0650 | 7.00[2] |
| Ratio of values Processed ore/ |  |  |  |  |

TABLE 6A-continued

|  | Au | Ag | Pt | Ti |
|---|---|---|---|---|
| Unprocessed ore | 27.94 | Infinite | 3.17 | 1.03 |

[1] = oz per ton
[2] = percent

RUN B (600 MESH)

A sample comprising 48.3 grams of raw ore was mixed with 96.6 grams of 98% $H_2SO_4$, 2 grams of NaCl and 20 grams of water. The sample was stirred and allowed to sit for 24 hours. The container and contents were then heated in a furnace under quiescent conditions to a temperature of 630°C. and the furnace was allowed to remain at this temperature for two hours. All fumes and gases were exhausted to a scrubber and scrubbed with 5400 mls. of water to which 50 mls. of concentrated HCl solution had been added. The residue removed from the oven, after cooling, weighed 96.3 grams. Again no attempt was made to leach the processed minerals from the residue but an analysis was run of the raw ore, the processed residue and the scrubber solution. The results are as reported in Table 6B.

TABLE 6B

|  | Au | Ag | Pt | Ti | Cr |
|---|---|---|---|---|---|
| Unprocessed ore | .00823[1] | 0 | .0205[1] | 6.8[2] | .0119[2] |
| Wt. in grams | .0000136 | 0 | .0000339 | 3.148 | .00575 |
| Wt. in residue | .000695 | .00103 | .0000575 | 3.290 | .00743 |
| Wt. in scrubber solution | .0000972 | .00027 | .0000918 | .036 | .0374 |
| Total Wt. after processing | .000792 | .00130 | .000149 | 3.326 | .0448 |
| Equivalent oz per ton | .479 | .785 | .090 | 7.21[2] | .0927[2] |
| Ratio of values Processed ore/ Unprocessed ore | 58.24 | Infinite | 4.39 | 1.06 | 7.79 |

[1] = oz per ton
[2] = percent

The above tests show that the more intimately the ore is mixed with the acids, i.e., the finer the grind, the more complete the chemical reaction will be in the super heated quiescent mixture. The metals are therefore released from bondage more readily to combine with the acids to form metalic salts. This shows that the invention is not only important for the recovery of metals, but also, provides a process for a more accurate assaying technique than those presently used. It should be emphasized, however, that it is not the assaying techniques per se that are inaccurate, but that methods heretofore used to extract the metals from the samples to be assayed have been incomplete. It is evident that once mineral sources have been treated according to the present invention that conventional assay techniques can then be employed to determine the amount of metals present.

EXAMPLE 7

The metal source used in this example is the residue from an electrolytic zinc plant. This residue is the undissolved calcine left after the zinc concentrate has been roasted to essentially a dead roast to remove the sulfur, leached with hot spent electrolyte containing sulfuric acid for a few hours to remove all the zinc oxide that will dissolve, and then filtered and washed with water. Usually, about five to ten percent of the zinc in the calcine is left undissolved because it is combined as an iron ferrite ($ZnO.Fe_2O_3$) which is insoluble in the leached solution. The residue in this test was attained from an operating plant and contained 19.21% zinc, 12.63% lead, 0.2005% copper, 0.0727% antimony, 0.0049% cobalt, 0.0067% nickel, 35.03% iron, no detectable gold, 4.497 ounces per ton of silver and small amounts of trace materials such as cadmium and germanium.

A sample of 14.21 grams of the residue ground to a minus 325 mesh was mixed with the solution containing 11.0 grams of 98% $H_2SO_4$ and about 10 grams of water. The mixture was stirred well and placed in a furnace under quiescent conditions where it was uniformly heated to 630° C., which temperature was maintained for a period of 1.5 hours. No scrubber was used. The residue from the baking process was subjected to leaching with a dilute $H_2SO_4$ acid solution and an analysis was made on the unprocessed ore, the leached residue and the leach solution. The results are as follows in Table 7:

TABLE 7

|  | Electrolytic Zinc Plant Residue | Baked and Leached Residue | Leach Solution | % Recovery of Mineral in Solution |
|---|---|---|---|---|
|  | Percent | Wt. in Grams | Grams | Grams | Percent |
| Zinc | 19.21 | 2.73 | .0302 | 2.80 | 103 |
| Copper | .2005 | .0285 | .00025 | .0290 | 102 |
| Cobalt | .0049 | .00072 | .00024 | .00058 | 80.5 |
| Nickel | .0067 | .00095 | .00021 | .00091 | 95.8 |
| Antimony | .0727 | .0103 | .0055 | .0053 | 51.5 |
| Lead | 12.63 | 1.80 | 1.39 | .420 | 23.3 |
| Iron | 35.03 | 4.98 | 1.447 | 3.893 | 78.2 |
| Gold | ND[1] | 0 | .192[2] | .0012[2] | —[3] |
| Silver | 4.497[2] | .0027 | 7.06[2] | .00006[2] | —[3] |

[1] = Not detectable
[2] = oz per ton
[3] = the leached residue was cyanided and yields of 99.5 % of the gold and 98.9 % of the silver were recovered.

The recoveries mentioned in the above tests are based on the minerals actually taken into the leach solutions with the exception of silver and gold which use recovered by cyanidation. It will be noted that zinc and copper here recovered quantitative yields. The tests show that all metals, including iron, are affected by the super heated acid. Usually when iron is decomposed, as has been the case in every test run, there is a release of noble metals nondetected by current assay techniques. All assaying reported is done using standard assay methods, mainly using an atomic absorbtion spectrophotometer.

EXAMPLE 8

This test was made using a typical raw zinc oxide ore which was ground to minus 150 mesh. Fifty grams of the ore were intermixed with 54 grams of 98% $H_2SO_4$ and 10 grams of water. The mixture was thoroughly stirred and then baked for two hours at 630° C. The fumes coming from the baking furnace were scrubbed with 4500 mls. of water. The baked residue was removed from the oven, cooled, and weighed, producing 62.8 grams of residue. The residue was leached for 1½ hours with 100 mls. of water followed by a leach of an hour and one-half with 200 mls. of water containing 20 mls. of 98% $H_2SO_4$. The dried leached residue weighed 19.7 grams. An analysis was made of the raw ore, the unleached residue, the leached residue, the leach solution and the gas scrubber solution with the results being as follows in Table 8:

TABLE 8

|  | Au | Ag | Pt | Zn |
|---|---|---|---|---|
| Unprocessed ore | .0338[1] | 1.54[1] | .0299[1] | 10.0[2] |
| Wt. in grams | .0000579 | .00264 | .0000512 | 5.00 |
| Wt. in unleached residue | .000232 | .00438 | .000259 | 5.263 |
| Wt. in leach residue | — | — | — | .069 |
| Wt. in leach solution | — | — | — | 5.194 |
| Wt. in scrubber solution | .00252 | .00090 | .000720 | .0099 |
| Total Wt. after processing | .00275 | .00528 | .000979 | 5.27 |
| Equivalent oz per ton of unprocessed sample | 1.61 | 3.08 | .572 | 10.50[2] |
| Ratio of values Processed ore/ Unprocessed ore | 47.50 | 2.00 | 19.12 | 1.05 |

[1] = oz per ton
[2] = percent

EXAMPLE 9

The unprocessed ore for this example was ground to minus 150 mesh. Fifty grams of the ore were placed into a container and intimately admixed with 60 mls. of concentrated HCl and 20 mls. of concentrated $HNO_3$, plus 20 mls. of water. After stirring, the mixture was placed in an oven and baked at 630° C. under quiescent conditions for a period of two hours producing 56.6 grams residue. The fumes coming from the baked sample were scrubbed in 5800 mls. of water containing 50 mls. of concentrated HCl, which was recirculated through a packed tower. The unprocessed ore, the unleached residue and the gas scrubber solution were all analyzed with the results being as follows in Table 9:

TABLE 9

|  | Au | Ag | Pt |
|---|---|---|---|
| Unprocessed ore (oz per ton) | .110 | .118 | .028 |
| Wt. in grams | .000188 | .000202 | .0000479 |
| Wt. in unleached residue | .000159 | .0197 | .0000583 |
| Wt. in scrubber solution | .000169 | .000986 | .000116 |
| Total Wt. after processing | .000328 | .0207 | .000174 |
| Equivalent oz per ton of unprocessed ore | .192 | 12.07 | .102 |
| Ratio of values Processed ore/Unprocessed ore | 1.74 | 102.47 | 3.63 |

EXAMPLE 10

A copper oxide silicate iron containing ore which is usually considered to be unprocessable because the copper cannot be leached, floated or otherwise treated, was ground to minus 150 mesh and a 55.6 gram sample was mixed with 90 grams of 98% $H_2SO_4$, 2 grams of NaCl and 20 grams of water. After stirring and baking for two hours at 630° C. under quiescent conditions there was left 66.3 grams of residue in the container. The gases emanating during the baking process were scrubbed with 5300 mls. of water containing 50 mls. of 98% $H_2SO_4$. The scrubbing was done by recirculating the scrubbing solution through a packed tower. The residue obtained was leached in 15 mls. of 98% $H_2SO_4$ diluted with 200 mls. of water. After leaching and drying 44.3 grams of leached resude remained. An analysis was made as recorded in Table 10 below:

TABLE 10

| Unprocessed ore (percent) | 4.73 |
|---|---|
| Wt. in grams | 2.63 |
| Wt. in leached residue | .0223 |
| Wt. in leach solution | 2.591 |
| Wt. in scrubber solution | .0168 |
| Percent recovered into solution | 99.1 |

EXAMPLE 11

A zinc-silver ore was ground to minus 150 mesh and 95 grams of the ore were mixed with 130 mls. of concentrated HCl, 30 mls. of concentrated $HNO_3$ and 10 mls. of water. The mixture was stirred well and placed in an oven at ambient temperatures which was heated to 700° C. and maintained at that temperature for 2 hours. The fumes from the baking process were scrubbed in 7800 mls. of a dilute HCl acid scrubbing solution which was recirculated through a packed tower. After baking, a residue comprising 122.0 grams was leached with 190 mls. of a solution comprising 150 mls. of water, 30 mls. of concentrated HCl acid and 10 mls. of concentrated $HNO_3$. The leached residue was dried and weighed at 75.6 grams. The raw ore, leached residue, leached solution and gas solution were all analyzed with the results being reported as follows in Table 11:

TABLE 11

|  | Au | Ag | Pt | Cu | Zn |
|---|---|---|---|---|---|
| Unprocessed ore | .0413[1] | 50.76[1] | .0506[1] | .380[2] | 5.00[2] |
| Wt. in grams | .000134 | .165 | .000165 | .361 | 4.75 |
| Wt. in unleached residue | .000186 | .168 | .000282 | — | — |
| Wt. in leached residue | .000186 | .168 | .000282 | .0101 | .0561 |
| Wt. in leach solution | — | — | — | .364 | 2.73 |
| Wt. in scrubber solution | .00156 | .00156 | .000780 | .0172 | 2.293 |
| Total Wt. after processing | .00175 | .170 | .00106 | .391 | 5.08 |
| Equivalent oz per ton of unprocessed ore | .539[1] | 52.28[1] | .325[1] | .391[2] | 5.10[2] |
| Ratio of Values Processed ore/ Unprocessed ore | 13.06 | 1.03 | 6.42 | 1.03 | 1.02 |
| % of Cu and Zn in Solution | — | — | — | 97.2% | 98.8% |

[1] = oz per ton
[2] = percent

EXAMPLE 12

An antimony containing ore was ground to minus 150 mesh. A 50 gram sample of the ore was mixed with 100 mls. of concentrated HCL, 5 mls. of concentrated $HNO_3$ and 10 mls. of water, and thoroughly mixed for 1½ hours and placed in a furnace preheated to a temperature of 300° C; within 45 minutes the temperature had reached 630° C. and the mixture was baked at 630° for one and one-half hours under quiescent conditions and then removed from the furnace. The gases emanating from the furnace were scrubbed in 5600 mls. of water containing 50 mls. of concentrated HCl. The residue coming from the furnace was leached in 510 mls. of a solution containing 100 mls. of concentrated HCl. The unprocessed ore, the unleached residue, the leached residue, the leached solution and the gas scrubber solution were analyzed with results being as reported in Table 12:

TABLE 12

|  | Au | Ag | Pt | Sb |
|---|---|---|---|---|
| Unprocessed ore | .00702[1] | ND[2] | .0115[1] | 5.90[3] |
| Wt. in grams | .000012 | 0 | .0000197 | 2.95 |
| Wt. in unleached residue | .0000755 | .000166 | .0000237 | — |
| Wt. in leached residue | .0000755 | .000166 | .0000237 | .452 |
| Wt. in leach solution | — | — | — | 2.23 |
| Wt. in scrubber solution | .000302 | .000168 | .000084 | .549 |
| Total Wt. after processing | .000378 | .000334 | .000108 | 3.01 |
| Equivalent oz per ton of unprocessed ore | .221 | .195 | .0628 | 6.02 |
| Ratio of values Processed ore/Unprocessed ore | 31.50 | Infinite | 5.48 | 1.02 |
| % of antimony leached | — | — | — | 92.1 |

[1] = oz per ton
[2] = not detectable
[3] = percent

EXAMPLE 13

A 100 gram sample of quartz was ground to minus 150 mesh and mixed with 60 mls. of concentrated HCl, 20 mls. of concentrated $HNO_3$ and 20 mls. of water, and thoroughly intermixed. The mixture was placed in a furnace and baked at a temperature of 700° C. under quiescent conditions for 2 hours. The gas released during the baking operation was scrubbed with 8000 mls. of a water solution. At the end of the baking procedure a residue of 107.3 grams was obtained. No attempt was made to leach the residue. The unprocessed ore, the unleached residue, and the gas scrubber solution were analyzed with the results being as follows in Table 13:

TABLE 13

|  | Au | Ag | Pt |
|---|---|---|---|
| Unprocessed ore (oz per ton) | .324 | .105 | .0219 |
| Wt. in grams | .00111 | .000360 | .0000750 |
| Wt. in unleached residue | .000588 | .000681 | .0000707 |
| Wt. in scrubber solution | .00192 | .0016 | .00112 |
| Total weight after processing | .00251 | .00228 | .00119 |
| Equivalent oz per ton of Unprocessed ore | .732 | .665 | .347 |
| Ratio of value Processed ore/Unprocessed ore | 2.26 | 6.33 | 15.87 |

EXAMPLE 14

A 400 gram sample of a finely divided unprocessed precious metal containing ore was stirred with 200 mls. of concentrated hydrofluoric acid and 100 mls of water to form a slurry. The slurry was placed in a furnace at 50° C. After one and one-half hours the furnace had reached an operating temperature of 630° C. and was maintained at that temperature for two additional hours. The fumes and vapors coming from the furnace during the baking operation were scrubbed in a packed tower with 3400 mls. of water. A residue of 529.2 grams was obtained.

The unprocessed ore, the unleached residue and scrubber solution were all analyzed with results as follows in Table 14:

TABLE 14

|  | Au | Ag | Pt |
|---|---|---|---|
| Unprocessed ore (oz per ton) | .0270 | .0548 | .00741 |
| Wt. in grams | .000370 | .000751 | .000102 |
| Wt. in unleached residue | .00102 | .000782 | .000446 |
| Wt. in scrubber solution | .000816 | .000680 | .00136 |
| Total wt. after processing | .00184 | .00146 | .00181 |
| EQuivalent oz per ton of Unprocessed ore | .134 | .106 | .131 |
| Ratio of value Processed ore/Unprocessed ore | 4.96 | 1.94 | 17.74 |

What is claimed is:

1. A process for treating mineral deposits to convert the non-ferrous metals contained therein to a recoverable form which comprises
   a. mixing a finely divided mineral deposit with an aqueous solution of an inorganic acid to form a slurry wherein the stoichiometric ratio of inorganic acid to non-ferrous metal is at least 1.5 to 1,
   b. heating said slurry to dryness and baking under quiescent conditions at a temperature of about 350° C. to 800° C. and for a period of time sufficient to convert said non-ferrous metals into recoverable metal salts.

2. The process according to claim 1 wherein the mineral deposit in an unprocessed ore or a processed ore taken from any processing stage.

3. The process according to claim 2 wherein the mineral deposit is reduced in particle size to 100 mesh or lss prior to treating.

4. A process according to claim 3 wherein the inorganic acid is selected from the group consisting of sulfuric acid, hydrochloric acid, nitric acid, hydrofluoric acid, perchloric acid, hypochlorous acid and mixtures thereof.

5. A process according to claim 4 wherein the inorganic acid is sulfuric acid.

6. A process according to claim 4 wherein the inorganic acid is a mixture of hydrochloric and nitric acids.

7. A process according to claim 4 wherein the slurry contains, in addition to the inorganic acid, a salt of an alkali, alkaline earth metal or iron.

8. A process according to claim 7 wherein the salt is selected from the group consisting of ferric sulfate and sodium chloride.

9. A process according to claim 5 wherein the ore is a copper or zinc ore and the slurry is heated to dryness and baked at a temperature of about 575° to 650° C.

10. A process for the recovery of non-ferrous metals from mineral deposits comprising the steps of
    a. mixing a finely divided mineral deposit with an aqueous solution of an inorganic acid to form a slurry wherein the stoichiometric ratio or inorganic acid to non-ferrous metal is at least 1.5 to 1,
    b. heating said slurry to dryness under quiescent conditions at a temperature of about 350° C. to 800° C. and for a period of time sufficient to convert said non-ferrous metals into recoverable metal salts, c. scrubbing the fumes or gases emanating from heating said slurry with an aqueous solution to remove volatilized non-ferrous metals removed during the heating process, d. treating the dried residue obtained from said heating process with one or more aqueous leach solutions to extract from said residue the soluble non-ferrous salts formed during the heating process, and e. recovering said non-ferrous metals from said scrubber and leach solutions.

11. A process according to claim 10 wherein the mineral deposit is an unprocessed ore or a processed ore taken from any processing stage.

12. A process according to claim 11 wherein the particle size of the mineral deposit is reduced to under 100 mesh.

13. A process according to claim 12 wherein the inorganic acid is selected from the group consisting of sulfuric acid, hydrochloric acid, nitric acid, hydrofluoric acid, perchloric acid, hypochlorous acid and mixtures thereof.

14. A process according to claim 13 wherein the inorganic acid is sulfuric acid.

15. A process according to claim 13 wherein the inorganic acid is a mixture of hydrochloric and nitric acids.

16. A process according to claim 13 wherein the slurry contains in addition to the inorganic acid, a salt of alkali, alkaline earth metal or iron.

17. A process according to claim 16 wherein the salt is ferric sulfate or sodium chloride.

18. A process according to claim 13 wherein the gases emanating from the heating step are scrubbed with a dilute solution of sulfuric acid or hydrochloric acid.

19. A process according to claim 15 wherein the dried residue from the heating step is leached with a dilute solution of sulfuric acid, hydrochloric acid, nitric acid, hydrofluoric acid or mixtures thereof.

20. A process according to claim 13 wherein the ore is a copper or zinc ore and the slurry is heated to dryness and baked at a temperature of about 575° to 650° C.

21. A process according to claim 20 wherein the metal recovered in the leach solution is a soluble salt of copper.

22. A process according to claim 20 wherein the metal recovered in the leach solution is a soluble salt of zinc.

23. A process for the recovery of precious metals selected from the group consisting of gold, silver and platinum from mineral deposits comprising the steps of a. mixing a finely divided mineral deposit with an aqueous solution of an inorganic acid to form a slurry wherein the stoichiometric ratio of inorganic acid to precious metal is at least 10 to 1, b. heating said slurry to dryness under quiescent conditions at a temperature of about 350° to 800° C. for a period of time sufficient to cause said precious metals to be released from whatever form they are in in the mineral deposit and be converted to recoverable metal salts, c. scrubbing the fumes or gases emanating from heating said slurry with an aqueous solution to remove volatilized precious metals removed during the heating process, d. treating the dried residue obtained from said heating process with one or more aqueous leach solutions to extract from said residue the soluble precious metals salt formed during the heating process, and e. recovering said precious metal from said scrubber and leach solutions.

24. A process according to claim 23 wherein the mineral deposit is an unprocessed ore, or a processed ore taken from any processing stage.

25. A process according to claim 24 wherein the particle size of the mineral deposit is reduced to under 100 mesh.

26. A process according to claim 25 wherein the inorganic acid is selected from the group consisting of sulfuric acid, hydrochloric acid, nitric acid, hydrofluoric acid, perchloric acid, hypochlorous acid, and mixtures thereof.

27. A process according to claim 26 wherein the inorganic acid is sulfuric acid.

28. A process according to claim 26 wherein the inorganic acid is a mixture of hydrochloric and nitric acid.

29. A process according to claim 26 wherein the gases emanating from the heating step are scrubbed with dilute solution of sulfuric acid, nitric acid, hydrochloric acid or mixtures thereof.

30. A process according to claim 26 wherein the dried residue from the heating step is leached with a dilute solution of an inorganic acid, an inorganic base or an aqueous cyanide.

31. A process according to claim 30 wherein the dried residue from the heating step is leached with a dilute acid solution wherein the acid is selected from the group consisting of sulfuric, hydrochloric, nitric and hydrofluoric acids or mixtures thereof.

32. A process according to claim 30 wherein the dried residue from the heating step is leached with an aqueous cyanide solution of potassium or sodium cyanide.

33. A process according to claim 30 wherein the dried residue from the heating step is first leached with water or a dilute solution of an inorganic acid and is then treated with a cyanide solution of potassium or sodium cyanide.

34. A process according to claim 31 wherein the metal recovered in the scrubber and leach solution is platinum.

35. A process according to claim 33 wherein the metal recovered from the scrubber and leach solutions is gold.

36. A process according to claim 33 wherein the metal recovered from the scrubber and leach solution is silver.

* * * * *